(12) United States Patent
Rus et al.

(10) Patent No.: US 12,422,791 B2
(45) Date of Patent: Sep. 23, 2025

(54) SIMULATION-BASED TRAINING OF AN AUTONOMOUS VEHICLE

(71) Applicant: Massachusetts Institute of Technology, Cambridge, MA (US)

(72) Inventors: Daniela Rus, Weston, MA (US); Sertac Karaman, Cambridge, MA (US); Igor Gilitschenski, Cambridge, MA (US); Alexander Amini, Cambridge, MA (US); Julia Moseyko, Orinda, CA (US); Jacob Phillips, Boston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 1092 days.

(21) Appl. No.: 17/345,738

(22) Filed: Jun. 11, 2021

(65) Prior Publication Data

US 2021/0389776 A1    Dec. 16, 2021

Related U.S. Application Data

(60) Provisional application No. 63/038,376, filed on Jun. 12, 2020.

(51) Int. Cl.
*G05B 13/04* (2006.01)
*G06F 16/50* (2019.01)
*G06T 3/00* (2024.01)
*G06T 7/50* (2017.01)

(52) U.S. Cl.
CPC ............ *G05B 13/04* (2013.01); *G06F 16/50* (2019.01); *G06T 3/00* (2013.01); *G06T 7/50* (2017.01); *G06T 2207/30252* (2013.01)

(58) Field of Classification Search
CPC .. G05B 13/04; G06T 7/50; G06T 3/00; G06T 2207/30252; G06F 16/50
See application file for complete search history.

(56) References Cited

U.S. PATENT DOCUMENTS

| | | | |
|---|---|---|---|
| 2010/0215250 A1* | 8/2010 | Zhu | G06F 16/29 382/154 |
| 2012/0127169 A1* | 5/2012 | Barcay | G06T 19/00 345/419 |
| 2018/0275658 A1 | 9/2018 | Iandola et al. | |
| 2019/0065637 A1 | 2/2019 | Bogdoll et al. | |

(Continued)

FOREIGN PATENT DOCUMENTS

CN    110991095 B  *  7/2020

OTHER PUBLICATIONS

Ihn-Sik Weon et al.; "Object Recognition Based Interpolation With 3D LIDAR and Vision for Autonomous Driving of an Intelligent Vehicle"; vol. 8, 2020 (Year: 2020).*

(Continued)

*Primary Examiner* — Rehana Perveen
*Assistant Examiner* — Nupur Debnath
(74) *Attorney, Agent, or Firm* — Occhiuti & Rohlicek LLP

(57) ABSTRACT

A controller for an autonomous vehicle is trained using simulated paths on a roadway and simulated observations that are formed by transforming images previously acquired on similar paths on that roadway. Essentially an unlimited number of paths may be simulated, enabling optimization approaches including reinforcement learning to be applied to optimize the controller.

12 Claims, 4 Drawing Sheets

(56) References Cited

U.S. PATENT DOCUMENTS

| | | | |
|---|---|---|---|
| 2019/0271559 A1* | 9/2019 | Colgate | G01C 21/3667 |
| 2019/0286153 A1* | 9/2019 | Rankawat | G05D 1/0246 |
| 2020/0074266 A1* | 3/2020 | Peake | G06V 10/764 |
| 2020/0167943 A1* | 5/2020 | Kim | G06T 7/579 |
| 2021/0110484 A1* | 4/2021 | Shalev-Shwartz | G05D 1/0088 |
| 2021/0150757 A1* | 5/2021 | Mustikovela | G06V 10/454 |
| 2021/0295171 A1* | 9/2021 | Kamenev | G06N 3/088 |
| 2021/0312203 A1* | 10/2021 | Patzwaldt | G06V 10/40 |

OTHER PUBLICATIONS

Jun Xie et al.; "Semantic Instance Annotation of Street Scenes by 3D to 2D Label Transfer"; (Year: 2016).*
Florian Chabot et al.; "Deep MANTA: A Coarse-to-fine Many-Task Network for joint 2D and 3D vehicle analysis from monocular image"; (Year: 2017).*
Ryan W. Wolcott; "Robust Localization in 3D Prior Maps for Autonomous Driving"; A dissertation submitted in partial fulfillment of the requirements for the degree of Doctor of Philosophy in the University of Michigan 2016 (Year: 2016).*
Pfeiffer, Mark, Michael Schaeuble, Juan Nieto, Roland Siegwart, and Cesar Cadena. "From perception to decision: A data-driven approach to end-to-end motion planning for autonomous ground robots." In 2017 ieee international conference on robotics and automation (icra), pp. 1527-1533. IEEE, 2017.
Pan, Xinlei, Yurong You, Ziyan Wang, and Cewu Lu. "Virtual to real reinforcement learning for autonomous driving." arXiv preprint arXiv:1704.03952 (2017).
Müller, Matthias, Vincent Casser, Jean Lahoud, Neil Smith, and Bernard Ghanem. "Sim4cv: A photo-realistic simulator for computer vision applications." International Journal of Computer Vision 126, No. 9 (2018): 902-919.

* cited by examiner

SIMULATION-BASED TRAINING OF AN AUTONOMOUS VEHICLE

CROSS-REFERENCE TO RELATED APPLICATIONS

This application claims the benefit of U.S. Provisional Application No. 63/038,376, titled "Simulation-Based Training," filed Jun. 12, 2020, which is incorporated herein by reference.

BACKGROUND

This application relates to simulation-based training of an autonomous vehicle.

In some examples, an autonomous vehicle has a controller that is configured according to policy to accept sensor measurements (also referred to as "observations" or "state observations"), including for example images acquired from the vehicle and to output control signals or commands that are provided to the vehicle, including for example speed and direction (e.g., steering) commands. A goal for the vehicle, such as a desired maneuver to be performed (e.g., lane change or merge), route to be followed, or a goal of stably remaining in a lane may be an input to the policy and/or may be otherwise integrated into the policy. These control signals, or equivalently the resulting incremental change in state of the vehicle (e.g., the change in location direction and speed of the vehicle), may be referred to as the "action" resulting from the policy. New sensor measurements are acquired after the vehicle has traveled according to the control signals, for example, an incremental time or distance, and new sensor measurements are presented to the policy, which then determines the next control signals to provide to the vehicle. This control process continues until the vehicle achieves its goal, or fails (e.g., crashes).

One goal of configuring a controller for an autonomous vehicle is to determine values of configurable parameters of a policy implemented by the controller such that the vehicle achieves the goal as well as possible according to a quantitative metric, for example, based on how well the vehicle remains in its lane.

SUMMARY

End-to-end trained neural networks for autonomous vehicles have shown promise for lane-stable driving. However, these neural networks often lack methods for learning robust models at scale and require vast amounts of training data that is time consuming and expensive to collect. Learned end-to-end driving policies and modular perception components in a driving pipeline often require capturing training data from all necessary edge cases, such as recovery from off-orientation positions or even near collisions. This is not only prohibitively expensive, but also potentially dangerous.

Training and evaluating robotic controllers in simulation has emerged as a potential solution to the need for more data and increased robustness to novel situations, while also avoiding the time, cost, and safety issues of current methods. However, transferring policies learned in simulation into the real-world remains an open research challenge.

Aspects described herein address this challenge by implementing an end-to-end simulation and training engine capable of training real-world reinforcement learning (RL) agents in simulation, without any prior knowledge of human driving or post-training fine-tuning. Trained models can then be deployed directly in the real world, on roads and environments not encountered in training.

In some examples, the engine synthesizes a continuum (or dense set) of driving trajectories that are photorealistic and semantically faithful to their respective real-world driving conditions, from a small dataset of human collected driving trajectories in a real-world environment. A virtual agent can not only observe a stream of sensory data from stable driving (i.e., human collected driving data), but also from a simulated band of new observations from off-orientations on the road. Given visual observations of the environment (i.e., camera images), the system learns a lane-stable control policy over a wide variety of different road and environment types, as opposed to current end-to-end systems which only imitate human behavior. This is a major advancement as there does not currently exist a scalable method for training autonomous vehicle control policies that go beyond imitation learning and can generalize to and navigate in previously unseen road and complex, near-crash situations.

State-of-the-art model-based simulation engines often do not provide enough detail (e.g., graphical detail) to generate an agent that can be directly deployed in real-world driving conditions. Unlike those approaches which use observations that might be generated from a fully synthetic world, the present observations are adapted from recordings of a real world and as a result are more realistic, resulting in more transferable agent policies.

By synthesizing training data for a broad range of vehicle positions and orientations from real driving data recorded in a limited number of vehicle positions and orientations, the learning engine can generate a continuum or a large set of novel trajectories consistent with that road and learn policies that transfer to other roads. This variety ensures that agent policies learned in our simulator benefit from autonomous exploration of the feasible driving space, including scenarios in which the agent can recover from near-crash off-orientation positions. Such positions are a common edge-case in autonomous driving and are difficult and dangerous to collect training data for in the real-world.

In a general aspect, a method of simulating an agent's view as the agent acts in a world includes obtaining a database of observations recorded by one or more entities as they traversed the route, each observation including an image obtained when the entity was in a corresponding state, simulating the agent's view including, in a first state of the agent, transforming an image associated with an observation recorded by the entity to approximate a view of the image that would be seen by the agent in the first state.

The method may include simulating the agent's view over a sequence of states, including transforming images associated with a corresponding sequence of observations recorded by the entity to approximate a sequence of views of the images that would be seen by the agent over the sequence of states. Simulating the agent's view as the agent acts in the world further may include simulating the agent's view over a plurality of sequences of states and training a control policy based on the simulated agent's view over the plurality of sequences of states.

Training the control policy may be further based on a plurality of actions taken by the agent to move through the plurality of sequences of states, the plurality of sequences of states, and a measure of quality of each sequence of states of the plurality of sequences of states. The image associated with each of the observations may include a photograph of a part of the world.

In another general aspect, software embodied on a non-transitory, computer-readable medium is configured for executing any one or any combination of the steps of methods set forth above.

In another general aspect, a method of training one or more policies includes receiving observation data for physical traversals of routes in a world, generating simulated observation data for simulated agents traversing simulated routes deviating from the entities' routes, and using the simulated observation data to train the one or more policies for control of agents in the real world.

It is to be understood that the foregoing description is intended to illustrate and not to limit the scope of the invention, which is defined by the scope of the appended claims. Other embodiments are within the scope of the following claims.

DETAILED DESCRIPTION

Figure 1:
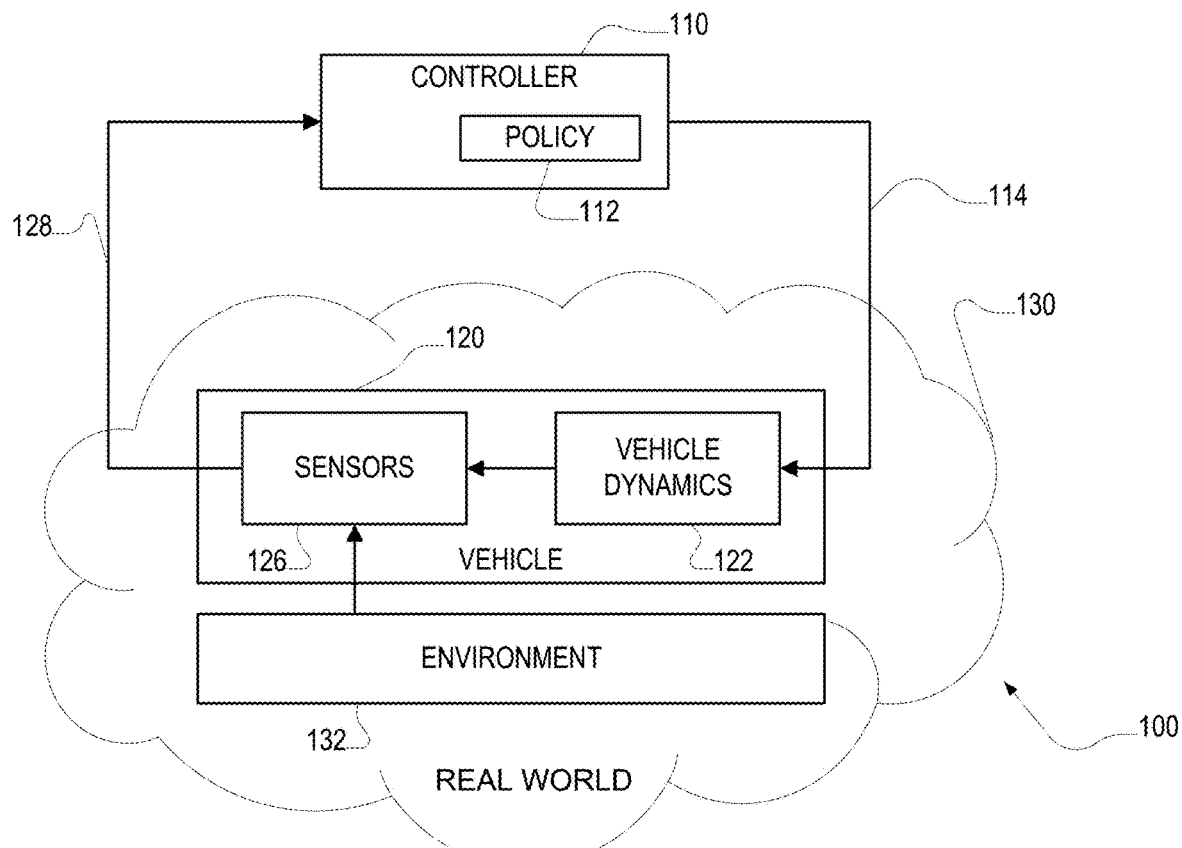
FIG. 1 is block diagram of an autonomous vehicle system.

Referring to FIG. 1, an autonomous vehicle system 100 has a controller 110, which provides commands or control signals, referred to herein as "actions" 114, to a vehicle 120 in response to observations 128 acquired by sensors 126 from the vehicle. These actions are applied as inputs to the vehicle 120, which result in incremental movement of the vehicle. As a result of the incremental movement, next observations 128 acquired by the sensors have a different point of view of the environment, and accordingly, the controller 110 provides a new action to apply to the vehicle dynamics to try to achieve the desired behavior of the vehicle.

In the system 100, the observations include successive images of the physical environment acquired by a camera affixed to the vehicle and may include other state information (e.g., the speed of the vehicle, steering angle, etc.). The physical vehicle 120 has a dynamic vehicle part 122, which responds to the actions 114. For example, the vehicle adjusts its speed ($v_t$) and adjusts its steering curvature ($\kappa_t$) based on the input action. Generally, the controller receives an observation 128 at a time t, and determined the action 114 to apply at time t. The vehicle then proceeds for an increment of time, for example, a fixed time step $\Delta t$ and then a new observation is acquired at time $t+\Delta t$. Over that increment of time, the physical vehicle proceeds according to the commanded action at time t. This control loop continues as the vehicle traverses a path on the roadway.

As introduced above, the vehicle has sensors 126 that including a camera, whose position and direction/orientation (i.e., its point of view) is that of the vehicle, and therefore each observation is acquired from a different point of view. (In the discussion below, for brevity a vehicle's "location" should from context be understood to include the position ($x_t$, $y_t$) as well as the direction or orientation $\theta_t$ of the vehicle.) In general, in addition to a 2D image, which includes pixel values (intensity, and optionally color) at different image locations, the sensors provide a corresponding "depth map" at those image locations, either by processing the 2D image (or sequence of images) or by using a separate depth sensor. In either case, the controller has available to it, for each image acquired by the camera, the range (i.e., distance) from the camera to the objects seen at image locations (e.g., for individual pixels) in the 2D image. The controller makes use of the combination of the 2D image and the depth map to generate the output action. As introduced above and discussed further below, the policy 112 defines the mapping from the image and depth map to the action to apply to the vehicle.

In the system illustrated in FIG. 1, as discussed later in this document, the controller includes a configurable policy 112 according to which it processes the observations 128 to determine the output actions 114, and one goal of one or more embodiments is to determine (e.g., "train", configure) the best policy as possible so the autonomous vehicle can be controlled according to the policy of achieve its goal. In particular, the policy may be configured according to values of several configurable parameters, and the training of the policy determines these values. Also note that in general the controller 110 is integrated into the vehicle (e.g., hosted on an on-board computing device), but the location of hosting of the controller is not critical to the approaches described below.

In the system 100 of FIG. 1, the actions 114 output from the controller 110 are essentially applied in the real world 130, which includes the environment 132 observed by the sensors 126, and the changes in the observations 128 represent change of state of the real world (i.e., including changes of state of the vehicle) resulting from applying the commanded actions 114. The controller 110 essentially replaces the role of a human operator, who would observe the environment 132 and apply physical controls to the vehicle.

Figure 2:
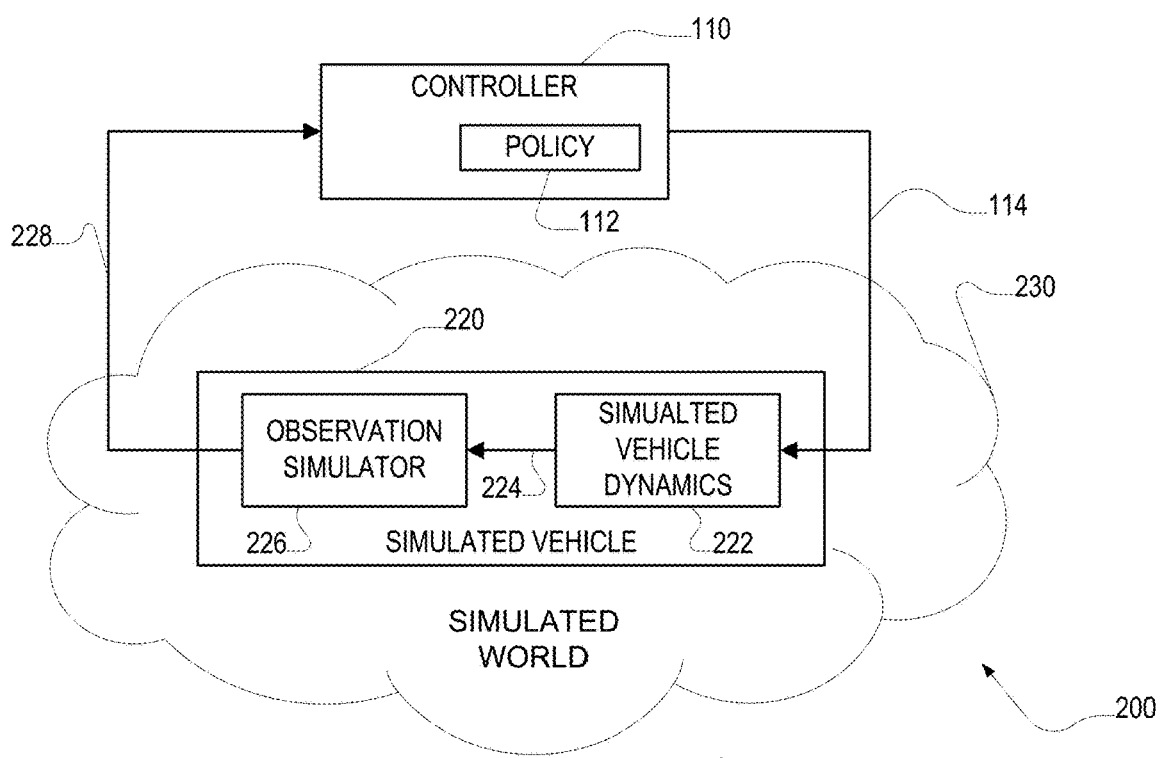
FIG. 2 is block diagram of a simulated autonomous vehicle system.

Referring to FIG. 2, operation of an autonomous vehicle may be simulated in a simulated system 200 by retaining the controller 110 illustrated in FIG. 1, and essentially replacing the physical world 130 of FIG. 1 with a simulated world 230 shown in FIG. 2. Such a simulation involves applying the output actions 114 of a controller to the simulated world 230 and simulating observations 228 to provide to the controller 110 to represent the simulated change of state of the simulated world. In particular, given commanded action 114, simulated dynamics 222 of a simulated vehicle 220 result in a change in the simulated vehicle state 224. This simulated vehicle state includes the incrementally changed location of the simulated vehicle over the simulated time step. For example, the change in location may be computed as $$\Delta\theta = |v_t \Delta t| \kappa_t,$$

$$\theta_{t+\Delta t} = \theta_t + \Delta\theta,$$

$$\Delta\hat{x} = (1 - \cos(\Delta\theta))/\kappa_t,$$

$$\Delta\hat{y} = \sin(\Delta\theta)/\kappa + t, \text{ and}$$

$$\begin{bmatrix} x_{t+\Delta t} \\ y_{t+\Delta t} \end{bmatrix} = \begin{bmatrix} x_t \\ y_t \end{bmatrix} + \begin{bmatrix} \cos(\theta_{t+\Delta t}) & -\sin(\theta_{t+\Delta t}) \\ \sin(\theta_{t+\Delta t}) & \cos(\theta_{t+\Delta t}) \end{bmatrix} \begin{bmatrix} \Delta x_t \\ \Delta y_t \end{bmatrix}.$$

An observation simulator 226 uses the simulated state to synthesize observations corresponding to the simulated vehicle's location, that is, from the simulated vehicle's point of view.

It may be appreciated that there are a variety of ways of synthesizing the observations form the simulated vehicle's point of view. In general, it is desirable to synthesize realistic observations in order for the simulation of the behavior of the simulated vehicle to accurately predict how a real autonomous vehicle would behave using the same controller and policy. That is, if the simulated observations 228 are not accurate representations of real observations 128 that would be acquired from a real vehicle, then the output 114 from the controller is not necessarily an accurate representation of the control that would have been applied to a real vehicle at the state of the simulated vehicle, and therefore the simulation does not well represent what would occur in the real world.

Figure 3:
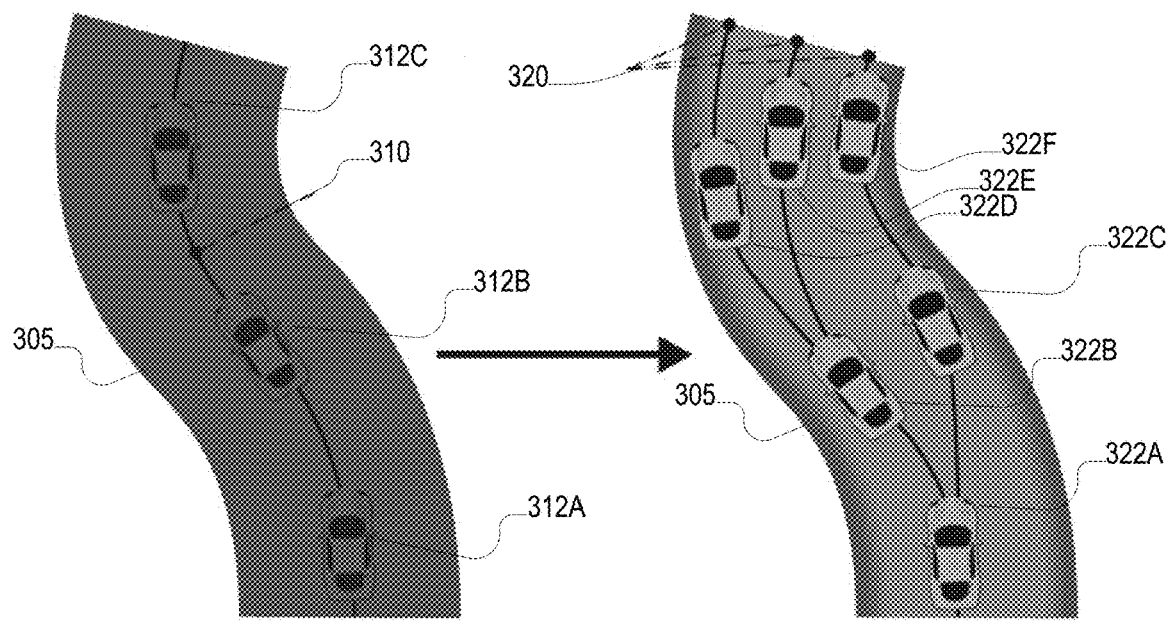
FIG. 3 is an illustration of vehicle locations on a path on a roadway and simulated vehicle locations on simulated paths on that roadway.

Referring to FIG. 3, a general approach applied in one or more embodiments presented below is to synthesize simulated images from previously acquired images from a traversal of the same roadway 305 by a human-driven or autonomous vehicle. In the example illustrated in FIG. 3, images were previously acquired by a physical vehicle at locations 312A-C on one path along the roadway 305. In simulated traversals of that same roadway 305, simulated observations are needed at simulated locations 322A-F, for example from multiple different simulated paths over the same roadway. As discussed more fully below, the general approach of one or more embodiments is, for a particular simulated location such as location 322B, to identify best matching location from which an image was previously acquired. In this example, an image acquired at location 312B may be selected. This image is then processed to adjust the point of view so that it matches location 322B rather than 312B.

Figure 4:
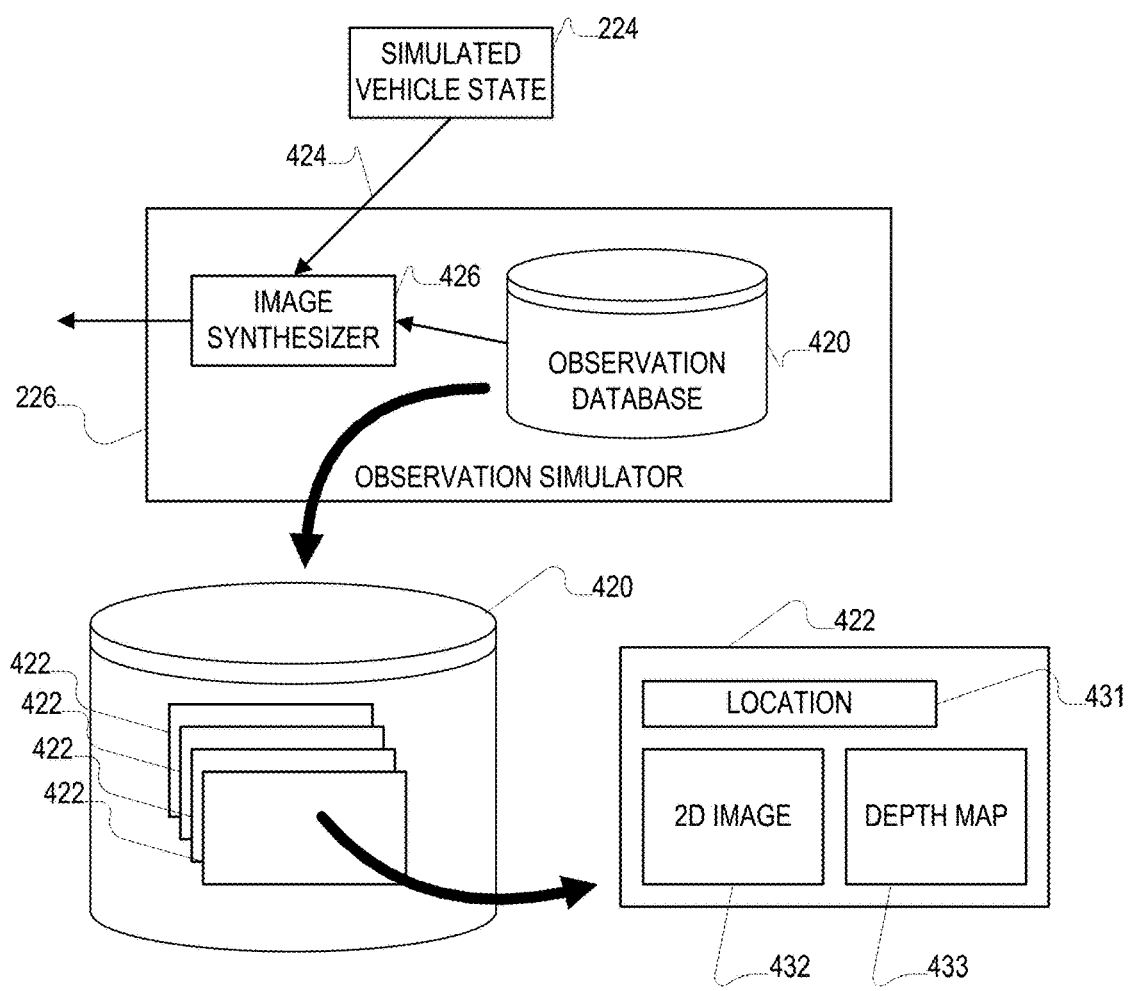
FIG. 4 is a block diagram of an observation simulator.

Referring to FIG. 4, an observation simulator 226 introduced with reference to FIG. 2 makes use of a real-world observation database 420 and an image synthesizer 426. The real-world observation database 420 includes, for example, images acquired at vehicle locations 312A-C as illustrated in FIG. 3, and the image synthesizer 426 produced, for example, images as would be acquired from locations 322A-F in FIG. 3, by transforming images from the real-world database 420.

Generally, the image synthesizer 426 receives a location 424 of a simulated vehicle (e.g., from the simulated vehicle state 224 in a simulation of an autonomous vehicle as illustrated in FIG. 2), locates one (or alternatively multiple) nearby images from the database 420, and performs a transformation of the database image(s) to synthesize the needed simulated image 228. The database 420 includes multiple image records 422. For example, each image record 422 includes a location 431 of the vehicle when it acquired the data in that record, a 2D image (i.e., pixel values) 432, and optionally a 2D depth map (i.e., providing range at the pixel locations) 433.

Figure 5:
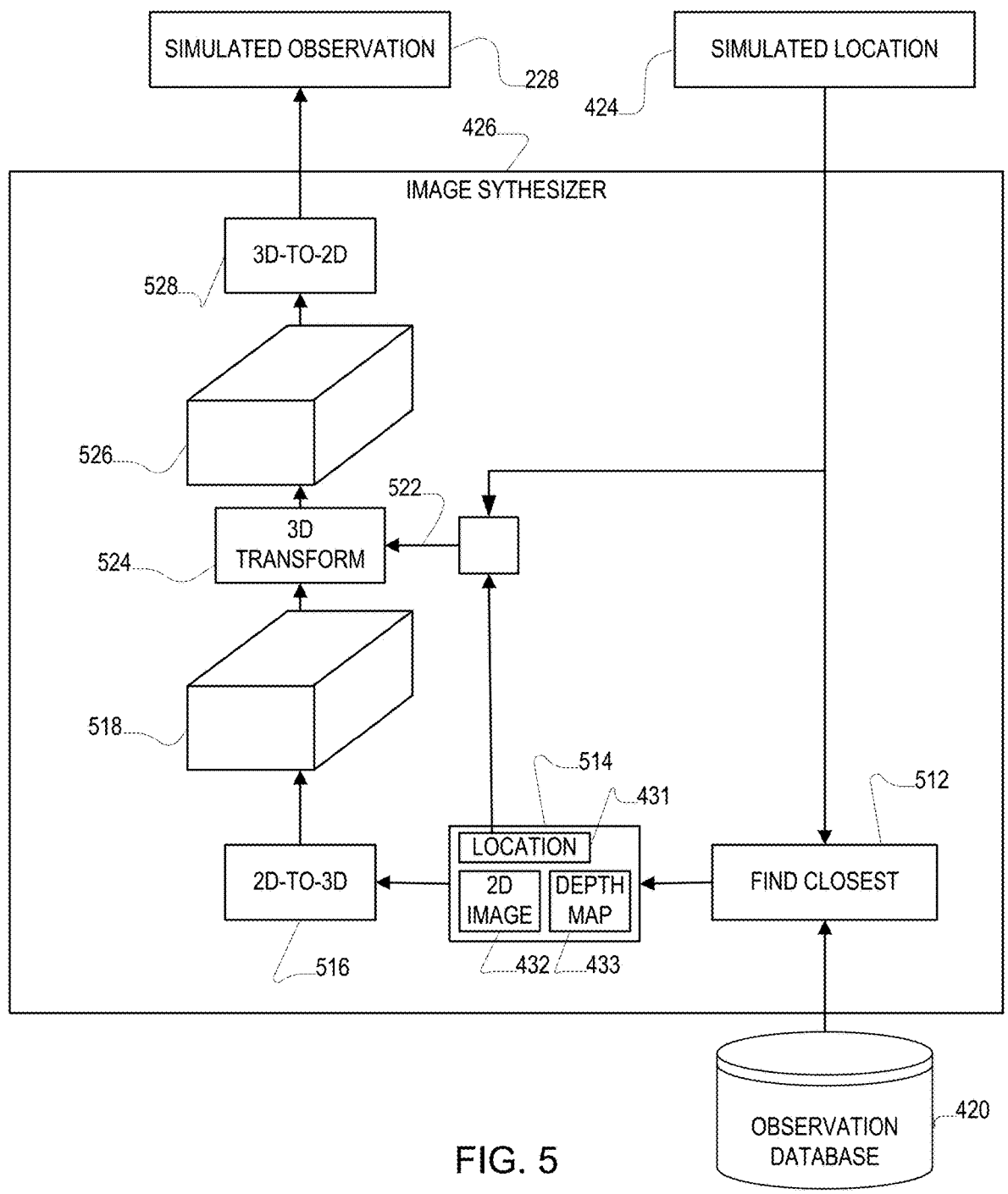
FIG. 5 is a block diagram of an image synthesizer.

Referring to FIG. 5, operation of the image synthesizer 426 provides a flow from a simulated location 424 through to an output simulated observation 228. A first processing step 512 finds the closest record 514 in the database 420 to the simulated location 324. That is, the location 431 of the record 514 best matches the simulated location 424. A closest match may be defined as requiring the least perturbation of the position and orientation for the location 431 of the record in the database to yield the simulated location 424. In the example illustrated in FIG. 5, the record 514 includes a stored depth map 433 corresponding to the 3D image 432 of the image. In some embodiments, this depth map is computed using a convolutional neural network trained in a supervised manner using stereo cameras.

In a next processing step 516, the 2D image 432 is projected into a 3D world frame to form a 3D observation 510 from the point of view of the location 431 of the retrieved record 514. The depth map 433 essentially provides the range at which to locate pixels in the 3D space.

A relative transformation 522 between the location 431 and the simulated location 424 is provided as input to a 3D coordinate transformation step 524, which takes as input the 3D observation 510 from the location the image was acquired, and produces as output a transformed 3D image 526 from the point of view of the simulated location 424. This transformed 3D image 526 is then mapped back into a 2D image 228, which is provided as output of the observation simulator 226. In some embodiments, the 2D image 228 is mapped to a smaller field-of-view than the collected image 432 (e.g., which starts at) 120°. Missing pixels are inpainted using a bilinear sampler, or alternatively, data-driven approaches could also be used.

Figure 6:
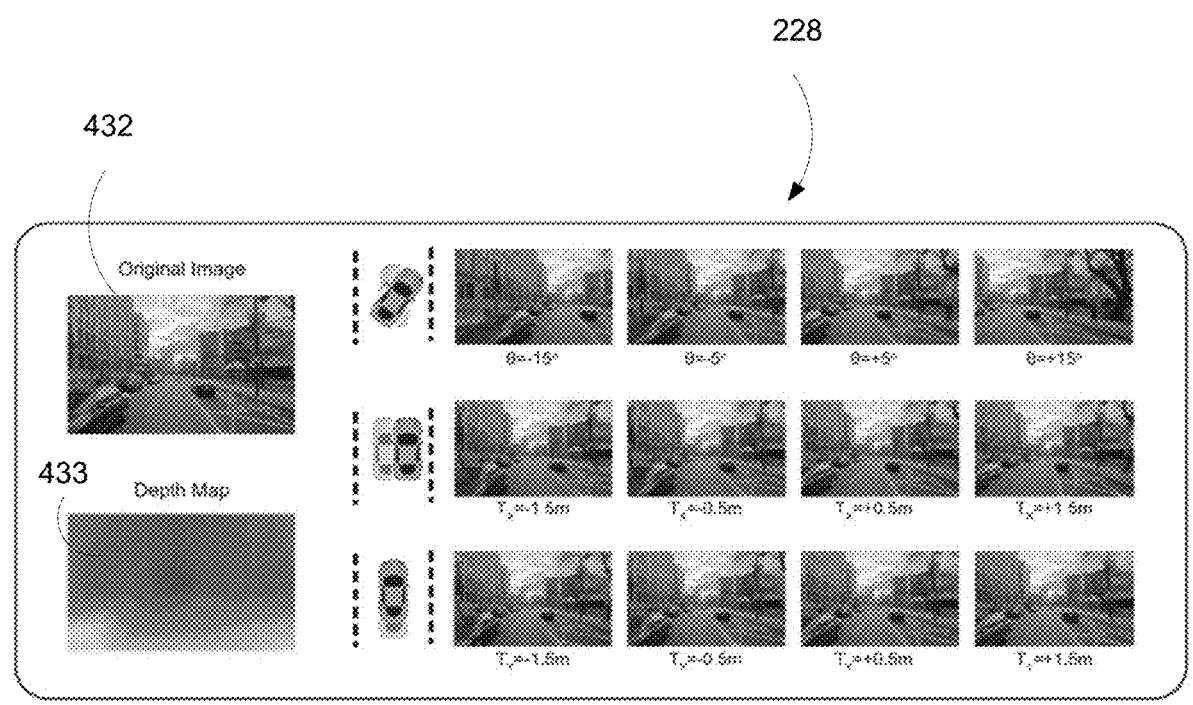
FIG. 6 is an illustration of an image synthesize for a range of deviations in orientation, lateral displacement, and longitudinal displacement.

Referring to FIG. 6, an embodiment, transformation of ±15 in orientation and ±15° both lateral and longitudinal translations up to ±1.5 m along the roadway are feasible. An acquired image 432 and its associated depth map 433 are processed to form simulated images 228 according to a range of changes in orientation (first row for θ from −15° to 15°), lateral displacement (second row for $T_x$ from −1.5 m to +1.5 m) and longitudinal displacement (third row for $T_y$ from −1.5 m to +1.5 m).

Realistic simulation of an autonomous vehicle under a particular control policy as described above may be used to refine or improve (e.g., "train" or update) the control policy to better achieve the desired behavior. One general class of approaches to improve a policy is referred to as "reinforcement learning" in which experience of the effect of actions that are applied in different states are used to improve the policy. With realistic simulation, simulated experience can be used to refine the policy without actually requiring a vehicle to perform the actions upon which the improvement in policy is based. One such learning approach is referred to as "end-to-end learning."

In an example of end-to-end learning using a Reinforcement Learning (RL) approach, the controller has a goal of lane-stable driving (i.e., having the vehicle stay in its lane on the roadway). In this example, the controller acts based on their current observation without memory or recurrence built in. Features are extracted from the observation image using a series of convolutional layers into a lower dimensional feature space, and then through a set of fully connected layers to learn the final control actuation commands Since all layers are fully differentiable, the model can be optimized entirely end-to-end according to error function. For example, the policy implements lateral control by predicting the desired curvature (inverse of the turning radius) of motion, which can be converted to steering angle for the vehicle.

In this example the parameters of a stochastic policy, which maps the observation (also referred to as the state in the context of RL) to a distribution of steering control (e.g., curvature) are updated based on a discounted reward, where the reward at time t is a discounted distance traveled between t and the time when the (simulated) vehicle requires an intervention (e.g., deviates from the center of a lane by 1 m, crashes, etc.). A gradient update procedure is then applied to maximize this discounted reward over simulated driving of the vehicle. Various simulated environments are used in the training. For example, different types of roadways, lighting (e.g., sun position), time of day, weather (e.g., rain) etc. can be sampled in training.

Alternative embodiments may have different control goals. For example, instead of a control goal lane-stable driving, a goal of end-to-end navigation (i.e., from a point A to a point B) may be learning by stitching together collected trajectories to learn through arbitrary intersection configurations. Other learning approaches may also be used. In other alternatives, a combination of human driving data and simulated autonomous driving data may be used to optimize the policy. Other inputs to the controller and policy may be used to augment the image data, for example, including other state information (e.g., vehicle state such as speed, environment state such as temperature or time of day, etc.), and sequence of images rather than individual images may be used as input to the policy. Other learning approaches may be used, and stochastic policy-based reinforcement learning is only an example. Other sensor systems may also be used. For example, multiple cameras may be used to acquire simultaneous images, and dedicated range sensors may be used.

The description above focusses on control of autonomous vehicles trained using a limited number of images collected by human-operated vehicles. However, other forms of agents other than autonomous vehicles, for example, other forms of vehicles (e.g., wheelchairs, aerial or underwater drones, etc.) can be used, and the similarly, other entities than human-operated vehicles may be used to acquire the observations that are used in the simulation procedures.

The approaches described above may be implemented in software, in hardware, or in a combination of software and hardware. Software can include instructions stored on computer-readable media that when executed by a processor cause the procedures described above to be performed. Some or all of the functions and procedures may be implemented in circuitry, including in application specific integrated circuits (ASICs), field programmable gate arrays (FPGAs) and the like.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method comprising:
    simulating a simulated agent's traversal of a simulated path in a real environment, including simulating an autonomous vehicle in a simulated traversal of a roadway;
    prior to simulation of the simulated agent's traversal of the simulated path, obtaining a plurality of observations acquired by real entities as they traversed real paths, each observation including an image acquired when a corresponding real entity was in a location corresponding to said image on one of the real paths, wherein at least some of the real paths traverse the roadway, and wherein the real entities comprise a human-operated real vehicle that traversed one of the real paths;
    wherein the simulating of the simulated agent's traversal comprises simulating a simulated agent's view to form simulated observations, including simulating a first image for a first location on the simulated path, the simulating of the first image including selecting a second image acquired by one of the real entities at a second location different than the first location, and transforming the second image to form the first image according to a relationship of the first location and the second location, wherein the second image comprises a two-dimensional image and the first image comprises a two-dimensional image, wherein transforming the second image to form the first image comprises forming a second three-dimensional image from the second two-dimensional image, forming a first three-dimensional image from the second three-dimensional image according to the relationship of the first location and the second location, and forming the first two-dimensional image from the first three-dimensional image;
    wherein the simulating of the simulated agent's traversal further comprises processing the simulated observations according to a control policy to yield control actions, and causing the simulated agent to transverse the simulated path according to the control actions;
    wherein the method further comprises updating the control policy according to the simulated agent's traversal of the simulated path, including updating the policy according to the simulated agent's traversal of a plurality of simulated paths according to simulations of the simulated agent's view in a plurality of environmental conditions.

2. The method of claim 1, wherein each image comprises a photographic depiction of the environment.

3. The method of claim 1, wherein selecting the second image includes selecting said image according to a match of the first location and the second location.

4. The method of claim 3, wherein the first location and the second location each includes a corresponding position and orientation, and the match of said locations is based on a degree of perturbation of the second location to yield the first location.

5. The method of claim 1, wherein forming the second three-dimensional image from the second two-dimensional image includes using a second depth map corresponding to the second two-dimensional image.

6. The method of claim 5, wherein forming the second three-dimensional image further comprises determining the second depth map from the second two-dimensional image.

7. The method of claim 1, wherein processing the simulated observations to yield control actions includes at least one of determining at least one of steering and speed commands.

8. The method of claim 1, wherein processing the simulated observations includes processing said observations using a convolutional neural network to yield the control actions.

9. The method of claim 1, wherein updating the control policy includes applying a Reinforcement Learning (RL) procedure to update a stochastic policy.

10. The method of claim 1, wherein the plurality of environmental conditions comprises at least one of different weather conditions, different times of day, and different road types.

11. The method of claim 1, wherein obtaining the plurality of observations acquired by the real entities as they traversed the real paths comprise acquiring images in a plurality of different environmental conditions.

12. A computer-readable medium comprising instructions stored thereon, the instructions when executed by a data processor cause operations including:

simulating a simulated agent's traversal of a simulated path in a real environment, including simulating an autonomous vehicle in a simulated traversal of a roadway;
prior to simulation of the simulated agent's traversal of the simulated path, obtaining a plurality of observations acquired by real entities as they traversed real paths, each observation including an image acquired when a corresponding real entity was in a location corresponding to said image on one of the real paths, wherein at least some of the real paths traverse the roadway, and wherein the real entities comprise a human-operated real vehicle that traversed one of the real paths;
wherein the simulating of the simulated agent's traversal comprises simulating a simulated agent's view to form simulated observations, including simulating a first image for a first location on the simulated path, the simulating of the first image including selecting a second image acquired by one of the real entities at a second location different than the first location, and transforming the second image to form the first image according to a relationship of the first location and the second location, wherein the second image comprises a two-dimensional image and the first image comprises a two-dimensional image, wherein transforming the second image to form the first image comprises forming a second three-dimensional image from the second two-dimensional image, forming a first three-dimensional image from the second three-dimensional image according to the relationship of the first location and the second location, and forming the first two-dimensional image from the first three-dimensional image;
wherein the simulating of the simulated agent's traversal further comprises processing the simulated observations according to a control policy to yield control actions, and causing the simulated agent to transverse the simulated path according to the control actions;
wherein operations futher include updating the control policy according to the simulated agent's traversal of the simulated path, including updating the policy according to the simulated agent's traversal of a plurality of simulated paths according to simulations of the simulated agent's view in a plurality of environmental conditions.

* * * * *